(12) United States Patent
Maeda et al.

(10) Patent No.: US 6,310,614 B1
(45) Date of Patent: Oct. 30, 2001

(54) TOUCH-PANEL INPUT DEVICE

(75) Inventors: Toshifumi Maeda; Hiroshi Tanaka, both of Toyama-Ken (JP)

(73) Assignee: SMK Corporation (JP)

( * ) Notice: Subject to any disclaimer, the term of this patent is extended or adjusted under 35 U.S.C. 154(b) by 0 days.

(21) Appl. No.: 09/353,224

(22) Filed: Jul. 14, 1999

(30) Foreign Application Priority Data

Jul. 15, 1998 (JP) .................................................. 10-199957

(51) Int. Cl.⁷ .............................................. G09G 5/00
(52) U.S. Cl. ............................................ 345/173; 345/174
(58) Field of Search ...................................... 345/173, 174, 345/176, 177; 178/18.03, 18.05, 18.01, 18.02, 18.04, 18.06, 18.07, 18.1

(56) References Cited

U.S. PATENT DOCUMENTS

| 4,017,848 | * | 4/1977  | Tannas, Jr. ........................ 341/34 |
| 4,644,101 | * | 2/1987  | Jin et al. ........................ 178/18 |
| 4,961,209 | * | 10/1990 | Rowlands et al. ................ 378/29 |
| 4,990,900 | * | 2/1991  | Kikuchi .......................... 345/174 |
| 5,028,744 | * | 7/1991  | Purcell et al. ................... 178/18 |
| 5,153,386 | * | 10/1992 | Siefer et al. .................... 178/18 |
| 5,771,039 | * | 6/1998  | Ditzik .......................... 345/178 |
| 5,943,043 | * | 8/1999  | Furuhata et al. ................ 345/173 |

* cited by examiner

Primary Examiner—Bipin Shalwala
Assistant Examiner—Ricardo Osorio
(74) Attorney, Agent, or Firm—Morrison Law Firm (57) ABSTRACT

Two transparent conductive panels are separated by a perimeter of elastic adhesive that forms a sealed gap in which transparent insulative fluid is interposed. The fluid has suspended conductive particles and a refraction index close to that of the panels to improve light transmittance through the device. The conductive particles and small gap width improves response time and prevents formation of a vacuum in the gap. The panels are connected to a position detection circuit that determines coordinate position of an applied pressure point. Spacers in the gap reduce the chance of response to accidental large-area contact which would result in an erroneous position command. The elasticity of the adhesive and the small gap width provide better temperature variation tolerance in addition to improved consistency and reliability of operation.

30 Claims, 6 Drawing Sheets

Prior Art

Fig. 6

Prior Art

TOUCH-PANEL INPUT DEVICE

BACKGROUND OF THE INVENTION

The present invention relates to a touch-panel input device overlayed on a liquid crystal panel, CRT or the like. An operator presses the device in a position corresponding to displayed information. The device determines the position pressed and sends appropriate command input data to a processing device such as a personal computer. The source of pressure on the device can be from a pen, finger or the like. More specifically, the present invention relates to a touch-panel input device that achieves improved visibility by sealing a transparent insulative fluid between transparent plates.

In general, touch-panel input devices are found on the display screen of a liquid crystal panel, CRT, or the like where an operator can select information by touching an appropriate area of the display. The touch-panel input device reacts to pressure applied to a transparent surface to indicate a specific position according to the contents of the display. The touch-panel device detects the display position selected and generates corresponding command input data. The generated command input data is then sent to a processing device such as a personal computer.

Touch-panel input devices of this type generally contain a movable plate positioned over a substrate. The substrate and movable plate are constructed to maintain a gap between the movable plate and the substrate when they are overlayed. The substrate and movable plate have conductive layers on the surfaces that face each other across the insulative gap. The conductive layers are made from transparent materials to provide visual access to the display screen. However, the presence of air between the substrate and the movable plate creates a large refraction index differential. This large refraction index differential results in a transmittance efficiency of 80%, making the screen difficult to view.

The difficulty in viewing the display screen is addressed in touch-panel input devices such as in Japanese laid-open patent publication number 64-14630 and Japanese laid-open patent publication number 2-105916. These publications disclose a solution to the above difficulty by injecting a transparent, insulative fluid between the substrate and the movable plate. The fluid has a refraction index that is close to that of the materials used in the substrate and the movable plate, thus reducing reflectivity and improving transmittance.

Figure 5:
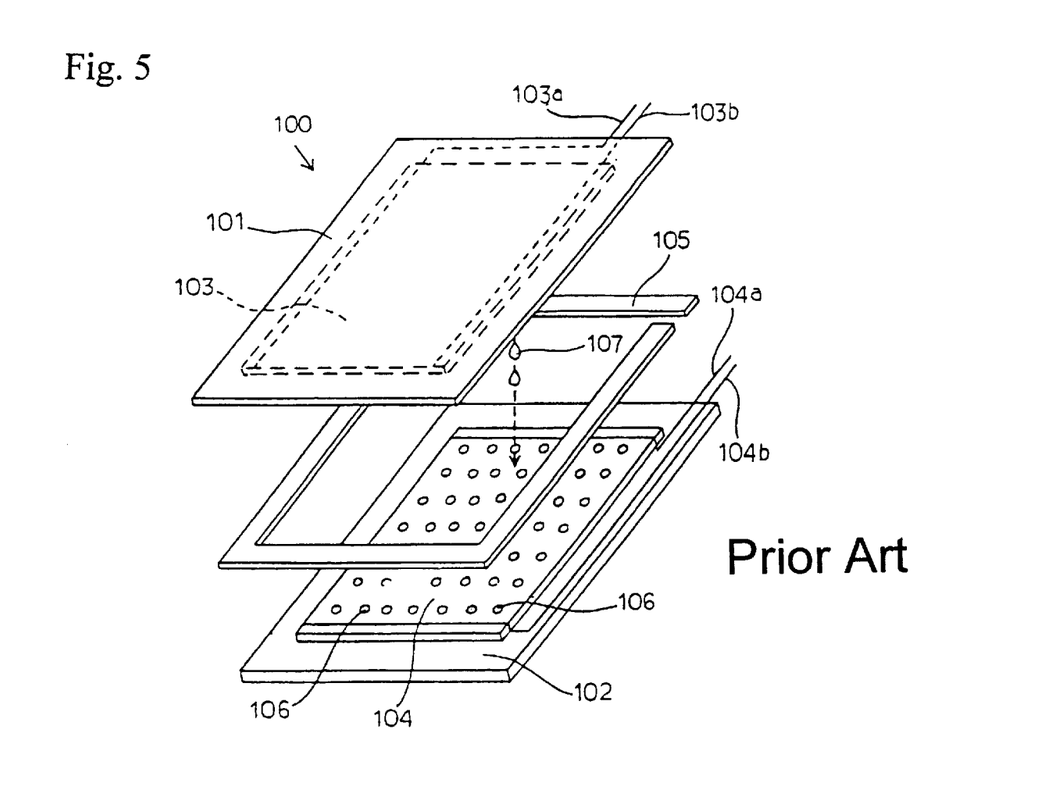
FIG. 5 is an exploded perspective drawing showing a conventional touch-panel input device.
Figure 6:
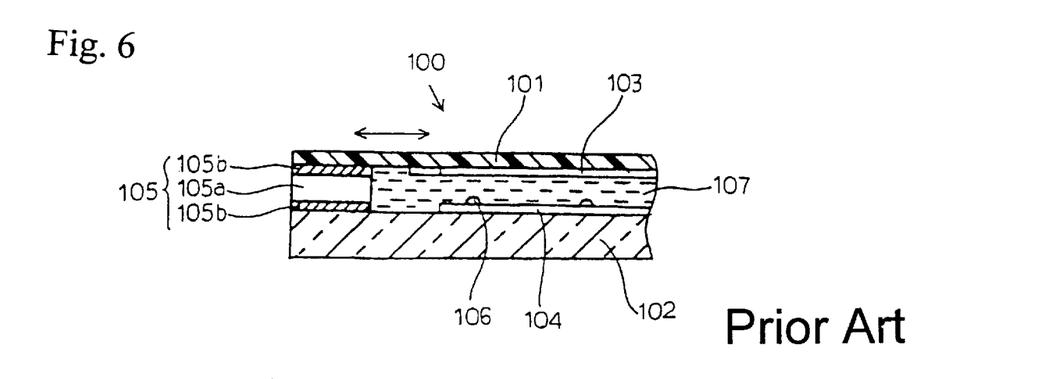
FIG. 6 is a schematic partial cross-section drawing of a conventional touch-panel input device.

Referring to FIG. 5 and FIG. 6, there is shown a conventional touch-panel input device 100. A thin transparent plate 101 is a movable plate and transparent substrate 102 is a thick substrate that faces a display device (not shown). A frame-shaped spacer 105 is layered between transparent plate 101 and transparent substrate 102 to form a slight gap.

Transparent conductor layers 103, 104 are composed of an Indium Tin Oxide (ITO) film or the like, printed on the facing surfaces of transparent plate 101 and transparent substrate 102. The ITO film is printed on the facing surfaces with a uniform thickness. Leads 103a, 103b, 104a and 104b are also printed on these facing surfaces to provide electrical connections for transparent conductor layers 103, 104. A voltage generated at a contact point between transparent conductor layers 103, 104 is measured on the electrical path provided by leads 103a, 103b, 104a and 104b. The measured voltage at the contact point enables detection of the position at which transparent plate 101 is pressed.

Transparent conductor layers 103, 104 are usually separated by spacer 105. Dot spacers 106 are printed on transparent conductor layer 104 at regular intervals sufficient to prevent light pressure applied to transparent plate 101 from causing accidental contact between the transparent conductor layers 103, 104. Dot spacers 106 are composed of an insulative composite resin such as epoxy resin. Dot spacers 106 augment the gap separation provided by spacer 105 to prevent position from being detected when transparent plate 101 is accidentally or lightly touched.

Spacer 105 is composed of a tacking agent 105b applied to upper and lower surfaces of a thin plate 105a. A sealed space between transparent conductor layers 103, 104 and within spacer 105 is formed by tacking thin plate 105a to transparent plate 101 and transparent substrate 102. Thin plate 105a is tacked to transparent plate 101 and transparent substrate 102 at the perimeters of transparent conductor layers 103, 104.

Transparent plate 101 can move horizontally (in the direction indicated by the arrow in FIG. 6) over tacking agent 105b while maintaining a sealed space between transparent conductor layers 103, 104. This configuration provides a close, tight contact between transparent plate 101 and spacer 105, while at the same time permitting transparent plate 101 to move elastically over thin plate 105a in a horizontal direction. When pressure is applied to transparent plate 101, the region surrounding the point of contact is uniformly flexed toward transparent substrate 102. The flexure of transparent plate 101 remains uniform, even if the point of contact is near spacer 105 in a perimeter region of transparent plate 101.

Once a sealed space between transparent conductor layers 103, 104 is achieved, a transparent insulative fluid 107 is injected into the space. Transparent insulative fluid 107 has a refraction index that is relatively close to the refraction indices for the transparent conductor layers 103, 104. For example, ITO has a refraction index of 1.9, while silicon oil, an example of a transparent insulative fluid 107, has a refraction index of 1.4.

Interposing transparent insulative fluid 107 between transparent conductor layers 103, 104 reduces the amount of light reflected by touch-panel input device 100 when exposed to an illumination source (not shown) located above touch-panel input device 100. Since transparent insulative fluid 107 has a refraction index relatively close to that of transparent conductor layers 103, 104, overall light transmittance increases to around 90%. The light reflected by touch-panel input device 100 is correspondingly reduced, thus significantly improving visibility of the display screen.

In this type of conventional touch-panel input device 100, pressure is applied to transparent plate 101 to create contact between transparent conductor layer 104 and opposing transparent conductor layer 103. The width of the gap between conductor layers 103, 104 is kept small to provide reliable contact and other advantages. One means of keeping the gap width small is to interpose between transparent conductor layers 103, 104 as a thin film. Transparent insulative fluid 107 then provides insulation between transparent conductor layers 103, 104 with a small gap width. However, the applied pressure to transparent plate 101 needed to create contact between transparent conductor layers 103, 104 increases significantly.

The increased pressure needed to create contact between transparent conductor layers 103, 104 can be achieved by use of a dedicated input device such as a stylus pen. The stylus pen applies increased pressure per unit area which makes reliable input more consistent. However, the addition of a stylus pen further complicates device operation by increasing the number of parts and slowing user input. Also, the stylus pen can be lost, which makes the device difficult to operate.

In addition to requiring greater pressure, the use of a person's finger to operate the device results in greater contact area. A curved surface such as a person's finger having a curvature radius of, for example, 25 mm, creates a relatively broad area of contact when applied to transparent plate 101. This broad area of contact requires increased pressure per unit area to assure contact between transparent conductor layers 103, 104. Such a large pressure requirement results in inadequate contact between transparent conductor layers 103, 104, unless a person presses very hard with a finger. Such a high pressure is difficult to achieve for all users, and also difficult to maintain.

Thus, when the device is used in operations such as tracing, drawing figures or characters, or dragging an icon or pointer, excessive pressure must be used to obtain reliable results. To achieve consistent results, a person must therefore apply a high pressure with a finger, which is difficult and tiring.

OBJECTS AND SUMMARY OF THE INVENTION

In view of the above discussion, it is an object of the present invention to provide a touch-panel input device which overcomes the drawbacks of the prior art.

It is also an object of the present invention to provide a touch-panel input device that reduces the gap between the conductor layers.

It is a further object of the present invention to provide a touch-panel input device that offers reliable detection of positions indicated by pressure.

It is still another object of the present invention to provide a touch-panel input device with a uniform operational tactile response, even when pressure is applied to an area near a corner or side of the input device.

Yet another object of the present invention is to provide a touch-panel input device that produces reliable and consistent response under light pressure from an operator's finger.

It is yet another object of the present invention to provide a touch-panel input device that requires less pressure per unit surface area to produce reliable operation results.

A still further object of the present invention is to provide a touch-panel input device that offers reduced reflectivity, improved transmittance, quick responsiveness and uniform transmittance, even when the device is tilted.

Briefly stated, the present invention provides two transparent conductive panels that are separated by a perimeter of elastic adhesive that forms a sealed gap in which transparent insulative fluid is interposed. The fluid has suspended conductive particles and a refraction index close to that of the panels to improve light transmittance through the device. The conductive particles and small gap width improves response time and prevents formation of a vacuum in the gap. The panels are connected to a position detection circuit that determines coordinate position of an applied pressure point. Spacers in the gap reduce the chance of accidental large-area contact which would result in an erroneous position command. The elasticity of the adhesive and the small gap width provide better temperature variation tolerance in addition to improved consistency and reliability of operation.

According to an embodiment of the present invention, there is provided a touch-panel input device comprising: at least first and second transparent plates having faces opposed to one another and substantially parallel, a portion of the opposing faces of the at least first and second transparent plates being transparent electrically conductive surfaces with uniform surface resistance, an elastic adhesive disposed around a perimeter of the conductive surfaces, whereby the opposing faces are bonded together and separated by a sealed gap having a uniform width, a transparent insulative fluid interposed in the sealed gap, the fluid having a refraction index close to that of the transparent plates, conductive particles dispersed in the fluid with specific gravities substantially identical to that of the fluid, at least one of the at least first and second transparent plates capable of resiliently flexing toward an other of the transparent plates, whereby an electrical relationship is changed between the conductive surfaces and the relationship is related to a coordinate position on the device.

According to a method of the present invention, there are provided steps for constructing a touch-panel input device comprising: forming transparent conductive layers with conductive leads on portions of at least two transparent plates, disposing a curable reactive adhesive on a perimeter of one of the conductive layers, curing the reactive adhesive to form an elastic pressure sensitive adhesive with a specified thickness on the transparent plate, applying a conductive bonding agent to an external connector, positioning the external connector in a region outside of a space defined by the adhesive and in contact with the conductive leads, pressing the transparent plates together with the conductive layers being opposed thereby bonding the transparent plates together and forming a sealed gap between the conductive layers, dispersing conductive particles in an insulative transparent fluid with a refraction index near that of the transparent plates, and interposing the fluid in the gap.

According to another embodiment of the present invention, there is provided a touch-panel input device comprising: at least first and second transparent plates having faces opposed to one another and substantially parallel, transparent electrically conductive layers disposed on each of the opposing faces, the conductive layers having substantially uniform surface resistance and electrical connection leads disposed on opposing ends of the conductive layers, pairs of the connection leads of the conductive layers defining a coordinate axis, regularly spaced insulative protrusions on at least one of the conductive layers effective to slightly increase and evenly distribute pressure applied to the transparent plates needed to cause contact between the conductive layers, an elastic adhesive disposed around a perimeter of the conductive layers, whereby the opposing faces are bonded together and separated by a sealed gap having a substantially uniform width, the protrusions having a thickness substantially less than the width of the gap, transparent insulative fluid interposed in the sealed gap, the fluid having a refraction index close to that of the transparent plates, conductive particles dispersed in the fluid, the particles having specific gravities substantially identical to that of the fluid and having outer diameters less than the thickness of the protrusions and an external connector connected to the leads.

According to yet another embodiment of the present invention, there is provided a touch-panel input device comprising: first and second conductive surfaces facing each other separated by a distance across a sealed space, at least the first conductive surface being transparent, a transparent insulative fluid substantially filling the sealed space, a proportion of transparent conductive particles in the insulative fluid, the distance exceeding a dimension of the conductive particles, whereby the conductive particles normally remain out of contact with at least one of the first and second conductive surfaces and the first conductive surface being deformable inward sufficiently to force at least one of the conductive particles into electrical contact with the first and second conductive surfaces, whereby an electrical resistance between the first and second conductive surfaces is changed.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
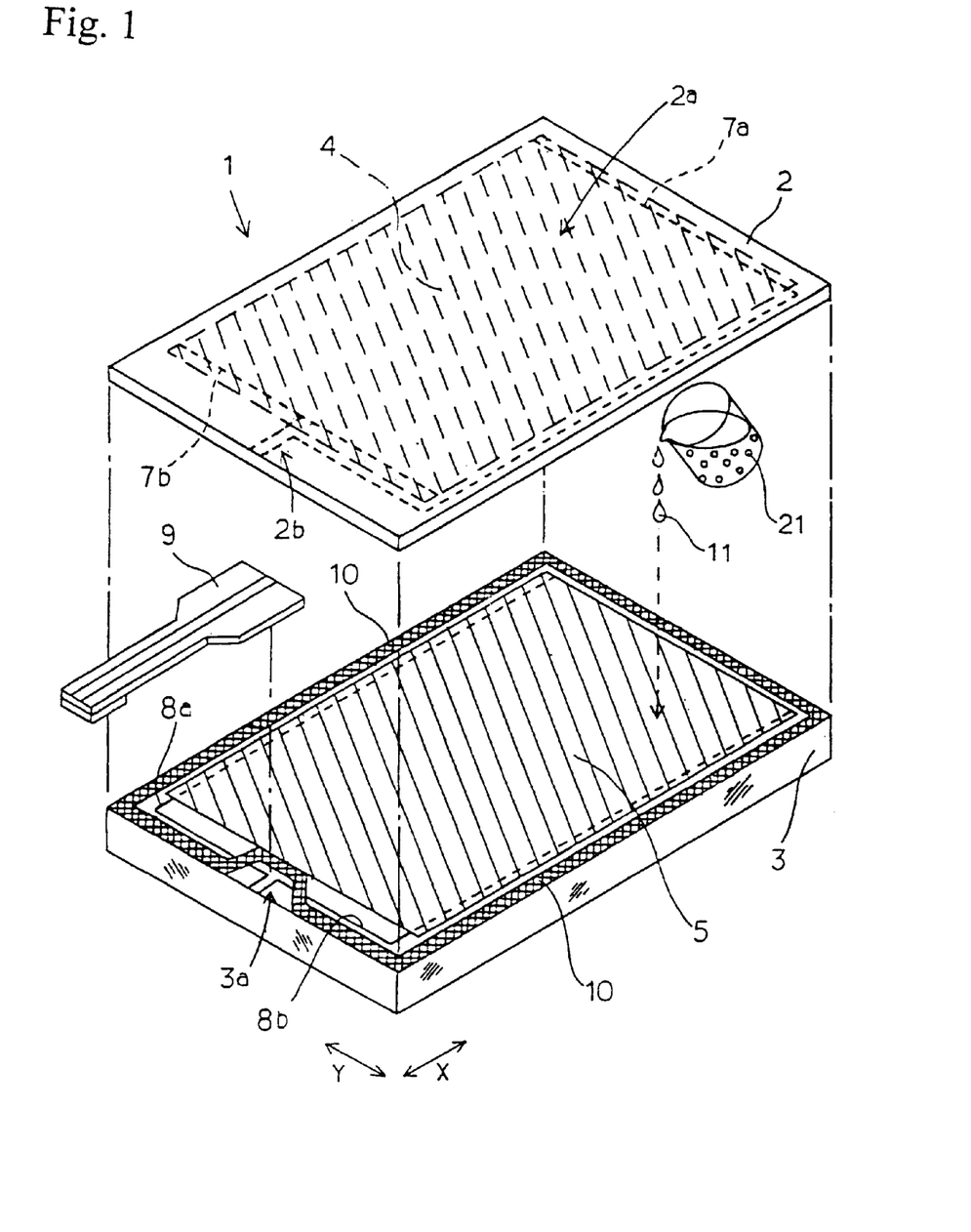
FIG. 1 is an exploded perspective drawing of a touch-panel input device according to the present invention.
Figure 2:
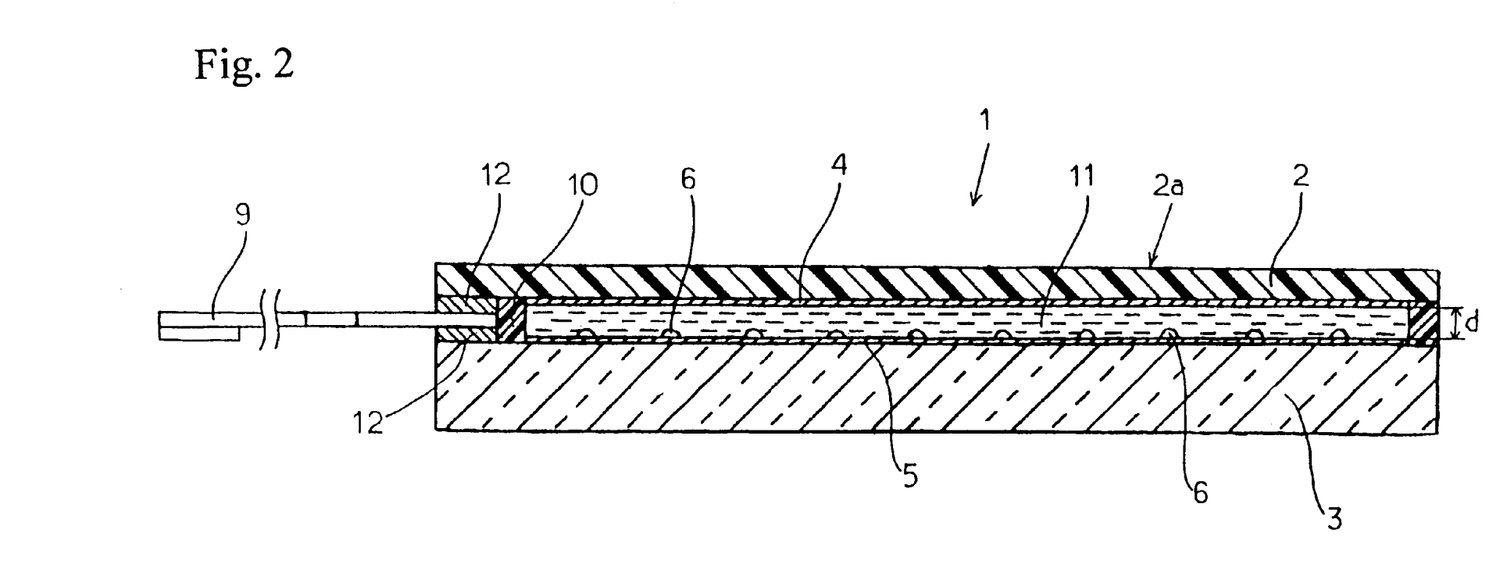
FIG. 2 is a vertical cross-section drawing of a touch-panel input device according to the present invention, in which a transparent insulative fluid is sealed.

Referring to FIGS. 1 and 2, an analog touch-panel device 1 includes an upper transparent plate 2 and a lower transparent substrate 3. Upper transparent plate 2 is a molded flexible sheet composed of a transparent synthetic resin such as, for example, polyethylene terephthalate (PET). Other examples of materials that can be used to construct upper transparent plate 2 include polycarbonate (PC), polyether sulfone (PES) and polyimide (PI). Other materials can be used as long as they are transparent and have a suitable degree of flexibility.

Upper transparent plate 2 serves as the top of touch-panel input device 1. A transparent hard-coat layer is applied to an upper surface of upper transparent plate 2 to protect the upper surface and to form a pressure input surface 2a.

Lower transparent substrate 3 serves as a bottom transparent plate of touch-panel input device 1. Lower transparent substrate 3 is disposed beneath and parallel to upper transparent plate 2. Lower transparent substrate 3 can be formed using the same material as upper transparent plate 2. However, the present embodiment uses a thin, rectangular plate formed from soda-lime glass as lower transparent substrate 3.

A movable conductor layer 4 and a fixed conductor layer 5 are fixed to opposing surfaces of upper transparent plate 2 and lower transparent substrate 3. Conductor layers 4, 5 are transparent conductive films of uniform thickness, with uniform resistance across the surface areas of the respective plates to which they are affixed.

Movable conductor layer 4 and fixed conductor layer 5 are both composed of Indium Titanium Oxide (ITO) and have uniform thickness. The uniform thickness of each layer enables a uniform resistance per unit of surface area for each conductive layer 4, 5. An undercoat of silicon film or the like (not shown in the figures) is disposed between an upper surface of lower transparent substrate 3 and fixed conductor layer 5. The undercoat acts as a barrier to prevent an alkaline component of lower transparent substrate 3 from contaminating other portions of touch-panel input device 1.

Referring to FIG. 2, dot spacers 6, composed of an insulative synthetic resin, are fixed at intervals of between 0.5 mm and 3 mm on fixed conductor layer 5. An embodiment according to the present invention has dot spacers 6 disposed at intervals of 2 mm. Dot spacers 6 have a height of about 5 microns, which is less than a height of a gap d between movable conductor layer 4 and fixed conductor layer 5. Dot spacers 6 prevent accidental contact between movable conductor layer 4 and fixed conductor layer 5. Examples of accidental contact include such instances when a person's hand or the like unintentionally applies pressure to a section of pressure input surface 2a.

Referring to FIG. 1, an X potential lead 7a and an X ground lead 7b are conductor leads printed on a lower surface of upper transparent plate 2. X leads 7a, 7b can be either transparent or non-transparent. An example of a conductor from which X leads 7a, 7b can be formed is a non-transparent silver paste. X leads 7a, 7b are electrically connected to opposing ends of movable conductor layer 4 along an X-axis direction. Each of X leads 7a, 7b have an end that extends to an external connection section 2b located on upper transparent plate 2. External connection section 2b provides an electrical connection between X leads 7a, 7b and an external circuit.

Similarly, a Y potential lead 8a and a Y ground lead 8b are conductors printed on the upper surface of lower transparent substrate 3. Y leads 8a, 8b may be either transparent or non-transparent and can also be formed from a silver paste. Y leads 8a, 8b are electrically connected to opposing ends of fixed conductor layer 5 along a Y-axis direction which is perpendicular to the X-axis direction. Each of Y leads 8a, 8b have an end that extends to an external connection section 3a located on lower transparent substrate 3. External connection section 3a provides an electrical connection between Y leads 8a, 8b and an external circuit. External connection section 3a faces external connection section 2b.

Figure 4:
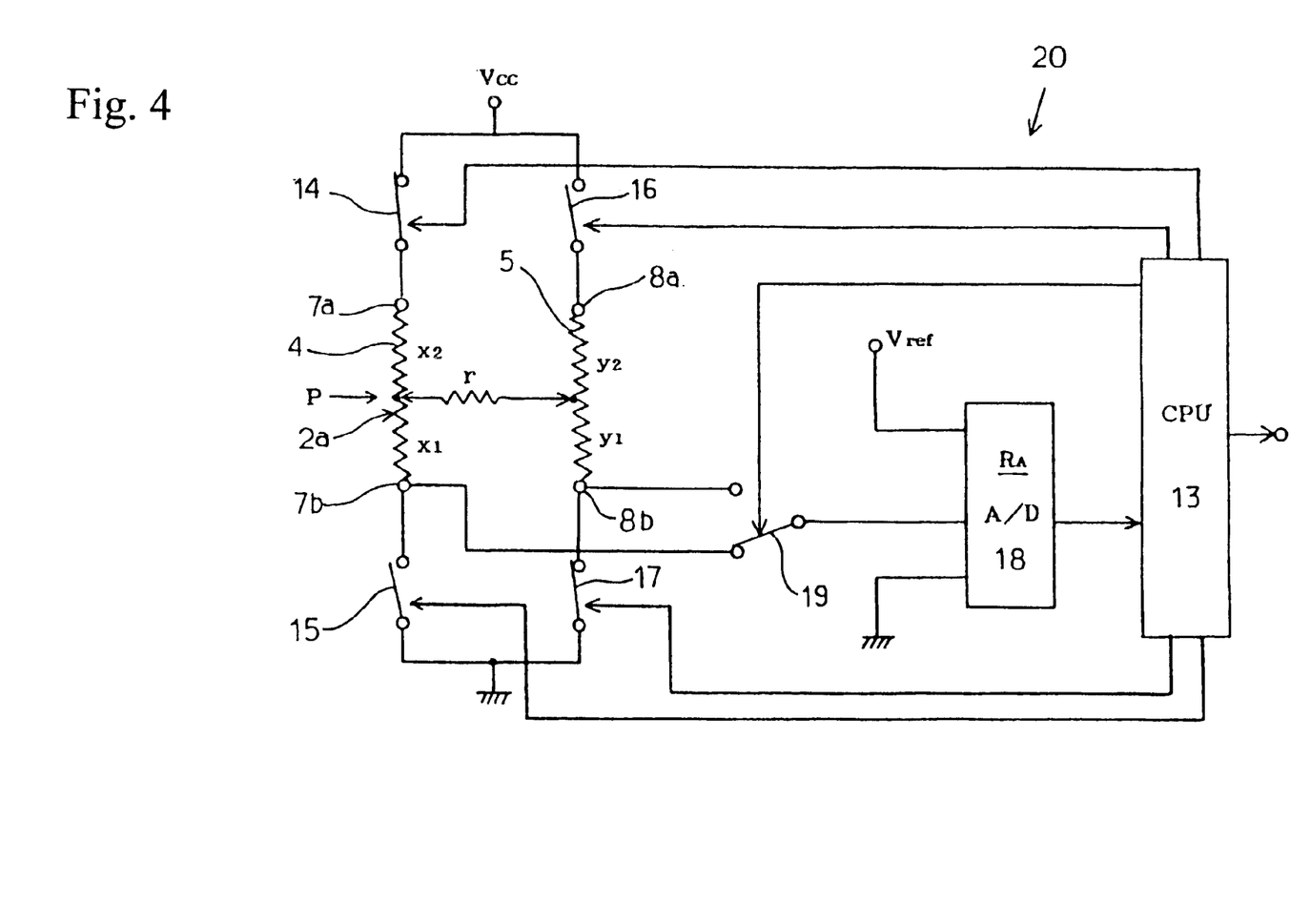
FIG. 4 is a circuit diagram of a position detection circuit with a pressure input.

Referring to FIG. 2, X and Y leads 7a, 7b, 8a, 8b that extend to external connection sections 2b, 3a, are connected to a flexible substrate 9 with a conductive adhesive 12. Flexible substrate 9 has printed patterns on upper and lower surfaces to provide electrical connections that correspond with connection sections 2b, 3a. Flexible substrate 9 is also electrically connected to a pressure position detecting circuit 20 to provide an electrical path for X and Y leads 7a, 7b, 8a and 8b, as shown in FIG. 4.

Upper transparent plate 2 and lower transparent substrate 3 are fixed to each other by a reactive adhesive disposed around conductor layers 4, 5. The reactive adhesive exhibits elasticity and tacking properties (e.g., Acheson Corp. product number ML-25251). The reactive adhesive cited as an example is an ultraviolet-curing pressure-sensitive adhesive, suitable for screen-printing. The thickness at which the reactive adhesive is applied can be adjusted to a specified value. For example, the reactive adhesive can be applied by printing to obtain a thickness of 40 microns measured from the upper surface of lower transparent substrate 3. In this instance, the reactive adhesive is defined as a bonding agents having 100% solid content and containing no solvents.

Referring to FIG. 1, the reactive adhesive is printed on the upper surface of lower transparent substrate 3 in a pattern that surrounds fixed conductor layer 5 while avoiding obstruction of external connection section 3a. This pattern of printing permits external connection section 3a to connect with flexible substrate 9 through conductive adhesive 12, without being blocked by the reactive adhesive.

Once printed on lower transparent substrate 3, the reactive adhesive is exposed to a source of ultraviolet rays. The molecules of the reactive adhesive are thus bonded after a few seconds exposure, effectively curing the reactive adhesive. The reactive adhesive hardens and is thus transformed into an adhesive layer 10 that exhibits elasticity.

Referring to FIG. 2, upper transparent plate 2 and lower transparent substrate 3 are assembled and pressed together. Adhesive layer 10 provides a separation between upper transparent plate 2 and lower transparent substrate 3 in this assembled state. Upper transparent plate 2 and lower transparent substrate 3 are then pressed together, thereby engaging the pressure sensitivity characteristic of adhesive layer 10. Opposing surfaces of upper transparent plate 2 and lower transparent substrate 3 are thus bonded together by adhesive layer 10. In this configuration, opposing movable conductor layer 4 and fixed conductor layer 5 face each other across a uniform gap d. Gap d is approximately 40 microns in width, which is substantially the same as the height of adhesive layer 10.

The reactive adhesive used in the above described embodiment exhibits elasticity upon hardening. The characteristic of elasticity permits upper transparent plate 2 to move elastically in a horizontal direction that is parallel to the X, Y plane. The capability of elastic movement is in a horizontal direction relative to adhesive layer 10 and lower transparent substrate 3. This configuration permits a reliable contact between conductor layers 4, 5 even when pressure is applied to input surface 2a in a region near adhesive layer 10. In such an instance, upper transparent plate 2 flexes elastically inward toward lower transparent substrate 3 to provide a consistent, resilient mechanism for creating contact between conductor layers 4, 5.

At the same time that upper transparent plate 2 and lower transparent substrate 3 are bonded together, transparent insulative fluid 11 is injected into the space between the two plates. Transparent insulative fluid 11 is injected into the space formed by gap d between movable conductor layer 4 and fixed conductor layer 5. Adhesive layer 10 forms a border surrounding the space defined by gap d so that the space is completely enclosed. Transparent insulative fluid 11 entirely fills, and is completely sealed within, the space defined by gap d and adhesive layer 10. This configuration prevents any external leakage of transparent insulative fluid 11 from touch-panel input device 1.

Gap d formed according to the above description is approximately 40 microns in width. The surface tension of insulative fluid 11 located in the narrow space defined by gap d and adhesive layer 10 overcomes the weight of insulative fluid 11. This feature permits touch-panel input device 1 to be vertically oriented, without creating a vacuum cavity in the space defined by gap d and adhesive layer 10. Accordingly, touch-panel input device 1 can be oriented in any given direction without forming a vacuum cavity in the defined space which would degrade the light transmittance of the display image, making it difficult to view.

Since the reactive adhesive in adhesive layer 10 is 100% solid and contains no solvents, there is no risk of solvents dissolving in transparent insulative fluid 11. Transparent insulative fluid 11 can thus contact adhesive layer 10 in the sealed space between plates, without being contaminated by solvents. Transparent insulative fluid 11 therefore suffers no degradation in transparency or insulative properties which would result from solvent contamination.

Various fluids can be used for transparent insulative fluid 11, as long as they are transparent. Some examples include fresh water, paraffin-based oils, petroleum-based oils, vegetable oil and silicon oil. The present embodiment of the invention uses a silicon oil having a viscosity of 5 cp. The use of silicon oil facilitates adjustments in the oil's viscosity which is a factor in pressing force.

Silicon oil has a refraction index of 1.4, which is closer to the refraction index of ITO (1.9) than that of air (1.0). Introducing silicon oil into the gap between conductor layers 4, 5 significantly reduces light reflectance at boundaries between the gap and conductor layers 4, 5 over a gap containing air alone. The silicon oil directly contacts conductor layers 4, 5, thus increasing overall light transmittance of the touch-panel input device 1 to 90% or more.

A plurality of conductive particles 21 are dispersed in transparent insulative fluid 11, which is composed of silicon oil. Applied pressure urges movable conductor layer 4 toward fixed conductor layer 5. Conductive particles 21 permit an electrical connection between conductor layers 4, 5 without conductor layers 4, 5 actually making contact. A smaller amount of pressure is therefore required to form a connection between conductor layers 4, 5 in comparison to a configuration in which there are no conductive particles 21 dispersed in transparent insulative fluid 11.

The preferred dispersion density of conductive particles 21 is in the range of from 2 to 30 particles per square millimeter. However, this dispersion density range may vary depending upon factors such as, for example, the viscosity specific gravity of transparent insulative fluid 11. When factors such as these can be varied to reduce the required pressure, the overriding consideration for dispersion density is avoidance of a short between conductor layers 4, 5 in the absence of pressure.

Conductive particles 21 are composed of a synthetic resin core surrounded by a plated conductive material. The core has a specific gravity of approximately 1.1 and the conductive material has a specific gravity of from approximately 2.5 to 16. Controlling the plating thickness permits the overall specific gravity of conductive particles to be set roughly to that of transparent insulative fluid 11. The silicon oil used as transparent insulative fluid 11 has a specific gravity of 1.4.

By matching the specific gravity of transparent insulative fluid 11, conductive particles 21 can be uniformly dispersed throughout the fluid to remain in a suspended state. Hence, concentrations of conductive particles 21 are avoided, even if touch-panel input device 1 is tilted. Conductive particles 21 remain in a suspended state without floating or settling and therefore maintain a uniform dispersion. This uniform density of conductive particles 21 in the space between the conductive layers 4, 5 provides consistent pressure activation level across touch-panel input device 1. Thus, regardless of orientation, the pressure required to operate touch-panel input device 1 is reduced and made consistent across pressure input surface 2a.

Determining which out of a given group of conductive particles 21 have the same specific gravity as transparent insulative fluid 11 is easily accomplished. For example, conductive particles 21 can be dispersed in transparent insulative fluid 11 and those which remain suspended can be retrieved while all others are removed. The material used for plating conductive particles 21 can be silver or any other conductive material as long as it is conductive and has a specific gravity greater than that of transparent insulative fluid 11.

The outer diameter of conductive particles 21 formed as described above must be smaller than the width of gap d. This dimension restriction prevents shorted connections between conductor layers 4, 5 when touch-panel input device 1 is inactive. Moreover, the outer diameter of conductive particles 21 is in the range of from 1 to 15 microns, which prevents them from being seen with the naked eye. This diameter restriction furthermore prevents conductive particles 21 from negatively affecting the transmittance of light through touch-panel input device. When dot spacers 6 are located within gap d as described above, the outer diameter of conductive particles 21 is slightly smaller than the height of the dot spacers 6. Dot spacers 6 are about 5 microns thick, which indicates an outer diameter of conductive particles 21 in the range of from 1 to 4 microns.

Figure 3A:
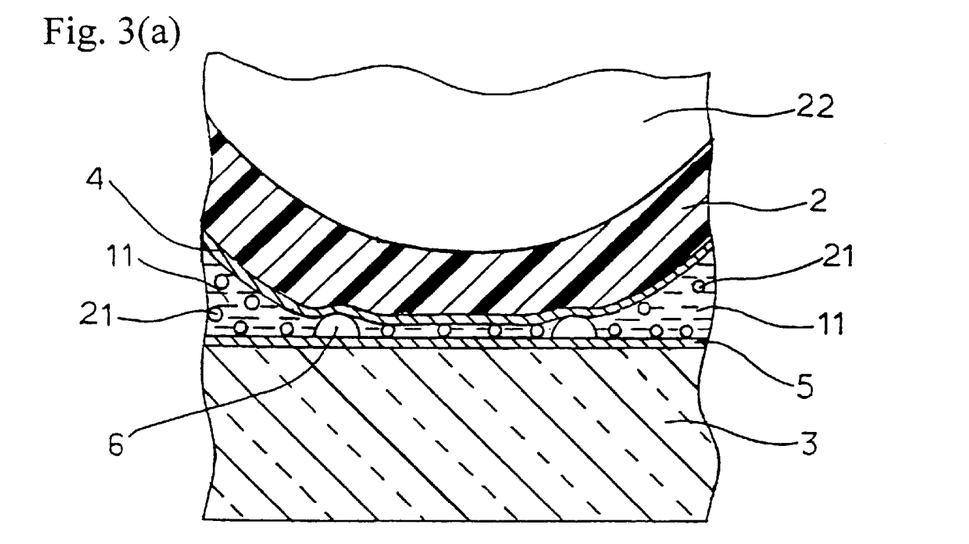
FIG. 3(a) is a schematic partial vertical cross-section drawing of a touch panel input device according to the present invention operated with a dedicated input pen.

Referring to FIG. 3($a$), a dedicated input pen 22 with a large surface curvature is shown applying pressure to pressure input surface 2$a$ of touch-panel input device 1. Movable conductor layer 4 contacts dot spacers 6, which are 5 microns thick, which also contact fixed conductor layer 5. In this instance the pressure per unit area is high, and a connection between movable conductor layer 4 and fixed conductor layer 5 is easily formed through conductive particles 21. Movable conductor layer 4 flexes in this example to effect a consistent contact between conductor layers 4, 5 and conductive particles 21.

Figure 3B:
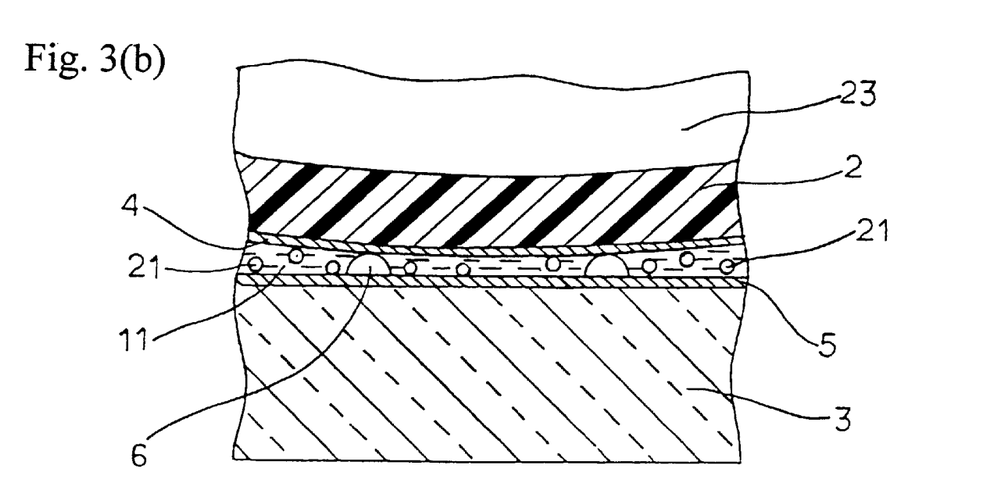
FIG. 3(b) is the device of FIG. 3(a) with pressure applied by a person's hand.

Referring to FIG. 3($b$), a person's hand 23 is shown accidentally pressing pressure input surface 2$a$, as can happen when using dedicated input pen 22. Pressure applied by hand 23 forms a curvature on upper transparent plate 2 that is close to a straight line. The slight curve produced by hand 23 results from pressure applied over a wide area. The pressure per unit area is low and movable conductor layer 4 is supported by contact with dot spacers 6. The arrangement of dot spacers 6 and movable conductor layer 4 prevents a connection between conductor layers 4, 5 in this instance. A connection is avoided even if conductor layers 4, 5 are individually in contact with conductive particles 21 because there is no continuity of contact between conductor layers 4, 5 and conductive particles 21. The lack of a connection in this instance prevents erroneous detection resulting from accidental pressure applied by hand 23.

Figure 3C:
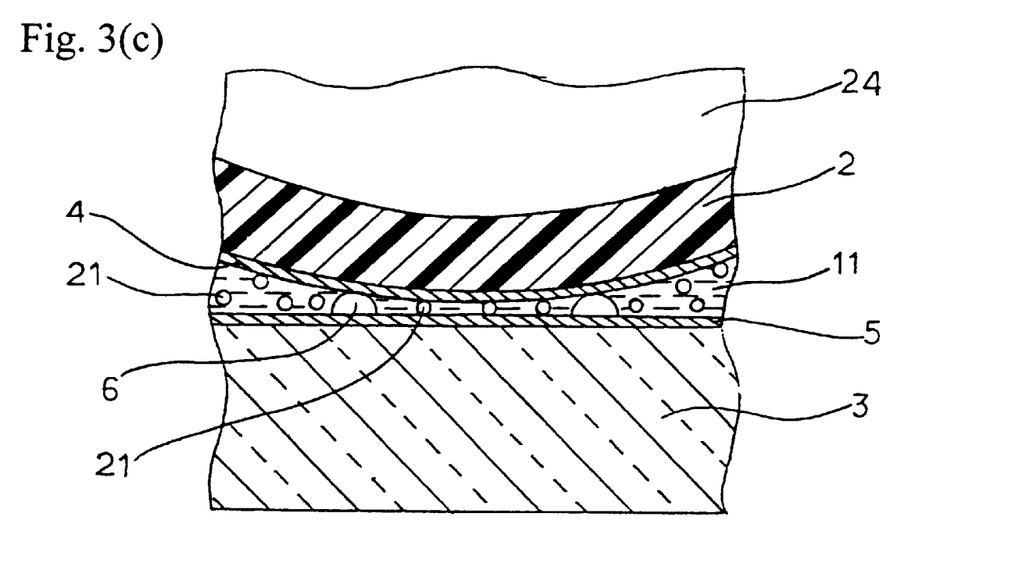
FIG. 3(c) is the device of FIG. 3(a) with pressure applied by a person's fingertip.

Referring to FIG. 3($c$), a person's finger 24 is shown applying pressure to upper transparent plate 2. In this instance finger 24 applies pressure over a relatively wide area resulting in a low pressure per unit area. The curvature radius of finger 24 in contact with upper transparent plate 2 is about 25 mm. Finger 24 has a smaller curvature radius than hand 23 and thus produces a more pronounced curvature in upper transparent plate 2. The greater curvature permits movable conductor layer 4 to approach closer to fixed conductor layer 5 in an area between dot spacers 6. Connection contact otherwise prevented by dot spacers 6 is thus permitted in this instance. Conductive particles 21 provide a connection path between conductor layers 4, 5 that would otherwise only be possible by the application of greater pressure. Introduction of conductive particles 21 into transparent insulative fluid 11 therefore reduces the amount of applied pressure necessary to create a connection contact between conductor layers 4, 5. A coordinate position resulting from lightly applied pressure is thus detectable without giving erroneous detections from accidentally applied pressure.

Referring to FIG. 4, a position detection circuit 20 is shown with a pressure input P. Position detection circuit 20 is part of touch-panel input device 1, which is attached over a display (not shown). A pen, finger, or the like applies pressure to pressure input surface 2$a$ in a position indicated by the display visible through touch-panel input device 1. The applied pressure results in pressure input P, which indicates a position on touch-panel input device 1. Pressure input P is converted to an analog signal which represents position coordinates. The analog signal is converted into command input data for use by a processing device such as, for example, a personal computer (not shown).

Movable conductor layer 4 and fixed conductor layer 5 are both formed to have uniform resistance across their respective surface areas. Thus, a coordinate detection voltage applied to potential leads 7$a$, 8$a$ of conductive layers 4, 5 produces potential gradients with equal slopes when ground leads 7$b$, 8$b$ are grounded. The applied voltage produces a potential proportional to the distance from a given lead to a position where conductive layers 4, 5 make electrical contact. A potential is therefore generated when pressure is applied to a given point on touch-panel input device 1 that is proportional to the distance from the given point to a conductive lead.

Detection of the position indicated by applied pressure is controlled by a CPU 13. CPU 13 first sets up an X coordinate detection mode by closing switches 14, 15 while opening switches 16, 17. Referring momentarily to FIG. 1, switches 14, 15 enable position measurement in a direction indicated by arrow X, while switches 16, 17 enable position measurement in a direction indicated by arrow Y. Referring again to FIG. 4, a switch 19 is connected to lead 8$b$ on one side, and to an input terminal of an A/D converter 18 on another side.

When pressure is applied to a point P on pressure input surface 2$a$ with position coordinates (Xp, Yp), an electrical connection is made between movable conductor layer 4 and fixed conductor layer 5. A voltage potential Vxp at point P on movable conductor layer 4 is given by the equation Vcc*x1/(x1+x2). In this equation, variable x2 represents the resistance of movable conductor layer 4 over a distance from the point of contact to lead 7$a$ on the X potential side. Variable x1 represents the resistance of movable conductor layer 4 over a distance from the point of contact to lead 7$b$ on the X ground side. A/D converter 18 reads the voltage potential Vxp on an input terminal and provides a representative digital value to CPU 13 to determine the x coordinate (Xp).

CPU 13 then sets up a Y coordinate detection mode by opening switches 14, 15 and closing switches 16, 17. Switch 19 is connected to an input terminal of A/D converter 18 on one side, and connected to lead 7$b$ of movable conductor layer 4 on the other side.

A voltage potential Vyp at point P on fixed conductor layer 5 is given by the equation Vcc*y1/(y1+y2). In this equation, variable y2 represents the resistance over a distance from the point of contact to lead 8$a$ on the Y potential side. Variable y1 represents the resistance over a distance from the point of contact to lead 8$a$ on the Y ground side. A/D converter 18 reads the voltage potential Vyp on an input terminal to determine the y coordinate (Yp).

The coordinate position resulting from the pressure applied to pressure input surface 2$a$ can then be detected by alternately activating the X and Y coordinate detection modes. An X coordinate is read each time the X coordinate detection mode is activated, and a Y coordinate is read each time the Y coordinate detection mode is activated.

The above described touch-panel input device 1 is of an analog type device. However, a digital type touch-panel input device 1 can also be constructed. In a digital type device, movable conductor layer 4 and fixed conductor layer 5 are divided into multiple strips of movable contact pieces and fixed contact pieces, respectively. These strips are bonded to opposing surfaces of upper transparent plate 2 and lower transparent substrate 3 to form perpendicular intersections. The intersections of the strips forms a matrix of contact positions which detect position when pressure is applied by making a connection at a corresponding intersection. The contact position, i.e., the point at which pressure is applied on transparent plate 2, is detected by movable contact pieces and fixed contact pieces that contact each other.

Dot spacers 6 with a thickness in the range of from 40 to 60 microns are disposed at intervals in the range of from 4 mm to 8 mm in the above described digital embodiment. A touch-panel input device 1 incorporating these dot spacers 6 has conductive particles 21 preferably with an outer diameter in the range of from 5 microns to 15 microns dispersed in transparent insulative fluid 11.

Dot spacers 6 may optionally be excluded from the design of touch-panel input device 1. Chances for accidental contact between conductor layers 4, 5 can be reduced by dispersing transparent insulative fluid 11. The resulting lower applied pressure required to operate touch-panel input device 1 is an improvement over operation according to conventional technology. Dispersing transparent insulative fluid 11 also provides a measure of protection from accidental contact.

In addition, the viscosity and dispersion density of transparent insulative fluid 11 can be selected in conjunction with the size of conductive particles 21 to provide protection from erroneous detection. A level of accidentally applied pressure can specifically be prevented, while positive operation of dedicated pens, fingers, and the like can be recognized. Selection of these variables as described permits the production step required for affixing dot spacers 6 to be eliminated.

Furthermore, transparent insulative fluid 11 can be eliminated altogether to decrease the amount of applied pressure required to operate touch-panel input device 1. In this instance a small pressure per unit area is all that is needed to operated the device.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A touch-panel input device comprising:
   at least first and second transparent plates having faces opposed to one another and substantially parallel;
   a portion of said opposing faces of said at least first and second transparent plates being transparent electrically conductive surfaces with uniform surface resistance;
   a transparent insulative fluid interposed in a gap between said first and second transparent plates, said fluid having a refraction index close to that of said transparent plates;
   conductive particles dispersed in said fluid with specific gravities substantially identical to that of said fluid;
   at least one of said at least first and second transparent plates capable of resiliently flexing toward an other of said transparent plates, whereby an electrical relationship is changed between said conductive surfaces; and
   said relationship is related to a coordinate position on said device.

2. A touch-panel input device according to claim 1, wherein:
   said relationship is a voltage drop across a resistance provided by an electrical connection through said conductive particles; and
   said voltage drop is related to said coordinate position on said device by a proportional relationship.

3. A touch-panel input device according to claim 1, wherein said gap is substantially uniform with a width in the range of from 5 to 50 microns.

4. A touch-panel input device according to claim 1, further comprising:
   an elastic adhesive disposed around a perimeter of said conductive surfaces, whereby said opposing faces are bonded together;
   said adhesive provides a seal, whereby said fluid is sealed in said gap; and
   said adhesive is composed substantially of solids.

5. A touch-panel input device according to claim 4, wherein said transparent insulative fluid has a viscosity with a surface tension within said gap that overcomes a weight of said fluid, thereby preventing formation of a vacuum cavity in said gap when an orientation of said device is changed.

6. A touch-panel input device according to claim 2, wherein said transparent conductive surfaces are transparent conductive layers disposed on said transparent plates with uniform thickness.

7. A touch-panel input device according to claim 6, wherein said transparent conductive layers are composed of Indium Titanium Oxide (ITO).

8. A touch-panel input device according to claim 6, further including:
   electrical connection leads on opposing ends of each of said transparent conductive layers;
   an external connector;
   said leads connected to said external connector; and
   said external connector effective to provide electrical connection to each of said leads from a device external to said touch-panel input device.

9. A touch-panel input device according to claim 8, wherein:
   each of said transparent conductive layers includes a plurality of parallel strips; and
   said pluralities on said opposing faces being substantially perpendicular to each other.

10. A touch-panel input device according to claim 8, wherein said external connector is electrically connected to an external device having a circuit effective to measure a selected voltage drop along a path through said conductive surfaces and particles to determine a coordinate position indicated by said electrical connection between said transparent conductive surfaces through said conductive particles.

11. A touch-panel input device according to claim 10, wherein:
   said circuit includes a DC voltage source;
   a controller for controlling input/output and switches;
   a first switch connected in series between said voltage source and a first lead on said flexible transparent conductive surface;

a second switch connected in series between said voltage source and a first lead on said rigid transparent conductive surface;

a third switch connected in series between a second lead on said flexible transparent conductive surface and ground;

a fourth switch connected in series between a second lead on said rigid transparent conductive surface and ground;

an input of an analog to digital converter connected through a fifth switch to said second leads on said conductive surfaces;

said controller receiving an output of said analog to digital controller; and said controller effective to control said switches to measure a first voltage across a first resistor network formed by contact between said transparent conductive surfaces and to measure a second voltage across a second resistor network formed by said contact, thereby effective to determine a coordinate position of said contact.

12. A touch-panel input device according to claim 6, further including:

a transparent barrier layer between said fixed transparent plate and said transparent conductive layer disposed on said fixed transparent plate; and said barrier layer effective to prevent contamination of said fluid.

13. A touch-panel input device according to claim 1, further including a transparent hard coat layer on an external surface of said flexible transparent plate.

14. A touch-panel input device according to claim 1, further including:

regularly spaced insulative protrusions disposed on at least one of said conductive surfaces; and a thickness of said insulative protrusions is substantially less than said width of said gap.

15. A touch-panel input device according to claim 14, wherein said protrusions are 5 microns in thickness or less.

16. A touch-panel input device according to claim 15, wherein said conductive particles have an outside diameter in a range of from 1 to 4 microns.

17. A touch-panel input device according to claim 14, wherein said conductive particles have an outside diameter less than said thickness of said protrusions.

18. A touch-panel input device according to claim 1, wherein:

said conductive particles have a core with a smaller specific gravity than that of said fluid;

said conductive particles have a conductive material covering with a specific gravity greater than that of said fluid; and dimensions of said core and said covering are adjusted to provide said conductive particles with overall specific gravities substantially identical to that of said fluid.

19. A touch-panel input device according to claim 18, wherein said conductive particles are dispersed in said fluid with a density in the range of from 2 to 30 particles per square millimeter in a projection of said fluid on a plane defined by one of said conductive surfaces, whereby said electrical relationship between said conductive surfaces through said particles is avoided when said device is inactive.

20. A touch-panel input device according to claim 18, wherein said covering has a specific gravity in the range of from 2.5 to 16.

21. A touch-panel input device according to claim 18, wherein said conductive particles have an outside diameter less than said width of said gap.

22. A touch-panel input device according to claim 21, wherein said conductive particles have an outside diameter in a range of from 1 to 15 microns.

23. A touch-panel input device according to claim 4, wherein said elastic adhesive is sufficiently elastic to permit said electrical relationship to change by application of external pressure near said perimeter without loss of resiliency or adversely affecting said sealed gap.

24. A touch-panel input device according to claim 4, wherein said elastic adhesive exhibits elasticity sufficient to permit said flexible transparent plate to move resiliently in a direction parallel to said rigid transparent plate.

25. A touch-panel input device comprising:

at least first and second transparent plates having faces opposed to one another and substantially parallel;

transparent electrically conductive layers disposed on each of said opposing faces, said conductive layers having substantially uniform surface resistance;

electrical connection leads disposed on opposing ends of said conductive layers;

pairs of said connection leads of said conductive layers defining a coordinate axis;

spaced apart insulative protrusions on at least one of said conductive layers effective to slightly increase and evenly distribute pressure applied to said transparent plates needed to cause contact between said conductive layers;

said protrusions having a thickness substantially less than said width of said gap;

transparent insulative fluid interposed in said sealed gap, said fluid having a refraction index close to that of said transparent plates; and conductive particles dispersed in said fluid, said particles having specific gravities substantially identical to that of said fluid and having outer diameters less than said thickness of said protrusions.

26. A touch-panel input device according to claim 25 further comprising:

an external connector connected to said leads;

a position detection circuit connected to said external connector;

at least one of said transparent plates capable of resiliently flexing to change an electrical relationship between said conductive layers; and said change in said relationship being measurable by said circuit effective to determine a point on said coordinate axis where said change in said relationship occurs.

27. A touch-panel input device according to claim 25, further including:

a transparent barrier layer between one of said conductive layers and said transparent plates; and a transparent hard coat layer on an external surface of another of said transparent plates.

28. A touch-panel input device comprising:

first and second conductive surfaces facing each other separated by a distance across a sealed space;

at least said first conductive surface being transparent;

a transparent insulative fluid substantially filling said sealed space;

a proportion of transparent conductive particles in said insulative fluid;

said distance exceeding a dimension of said conductive particles, whereby said conductive particles normally remain out of contact with at least one of said first and second conductive surfaces; and said first conductive surface being deformable inward sufficiently to force at least one of said conductive particles into electrical contact with said first and second conductive surfaces, whereby an electrical resistance between said first and second conductive surfaces is changed.

29. A touch-panel input device according to claim 28, further including an array of insulative spacers spaced apart on at least one of said first and second conductive surfaces.

30. A touch-panel input device according to claim 28, wherein:

said first and second conductive surfaces are separated by an elastic adhesive; and said adhesive forms a border of said sealed space.

* * * * *